United States Patent [19]

Watts

[11] 4,168,354
[45] Sep. 18, 1979

[54] POLYCHLORIDE FILM CASTING COMPOSITION

[75] Inventor: William A. Watts, Uniontown, Ohio

[73] Assignee: The Goodyear Tire & Rubber Company, Akron, Ohio

[21] Appl. No.: 849,371

[22] Filed: Nov. 7, 1977

[51] Int. Cl.² .............................................. C08K 5/10
[52] U.S. Cl. ....................................... 525/5; 260/31.6
[58] Field of Search ........................ 260/28.5 D, 31.6; 526/5

[56] References Cited

U.S. PATENT DOCUMENTS

| | | | |
|---|---|---|---|
| 3,479,308 | 11/1969 | Gattenby | 260/31.6 |
| 3,542,713 | 11/1970 | Gillio-Tos | 526/5 |
| 3,558,537 | 1/1971 | Hecker | 526/5 |
| 4,057,672 | 11/1977 | Creekmore | 260/31.6 |

*Primary Examiner*—Paul R. Michl
*Attorney, Agent, or Firm*—J. D. Wolfe

[57] ABSTRACT

An improved polyvinyl chloride film casting composition is obtained by using a combination surfactant of glycerol monooleate with at least a second surfactant composed of sorbitan monolaurate, sorbitan monopalmitate, sorbitan monostearate and sorbitan monooleate.

2 Claims, No Drawings

POLYCHLORIDE FILM CASTING COMPOSITION

This invention relates to an improvement in compounding of polyvinyl chloride resin for use in a cast film operation to permit cast film to be made at faster speeds and under better film quality control conditions and its method of use.

Polyvinyl chloride resins are produced and consumed in billions of pounds anually. These resins are compounded in various ways, depending on the end use, for instance, in making films. Polyvinyl chloride resins are compounded for use in making film by either casting or extruding. Consequently, the rate at which the film can be produced by either of the methods determines which method has the economical advantage and is preferred in the market place if the quality of the film is comparable.

This invention provides a compounded polyvinyl chloride that can be cast as a film at a faster rate, still more readily maintain the film gauge and strip the cast film from the casting surface whereby it can be rolled up on a roll faster.

These benefits and advantages are obtained by the use of special surfactants in the basic film casting recipe comprising polyvinyl chloride, plasticizer, lubricants, stabilizers, including ultraviolet light stabilizing agents and solvents. Specifically, this improvement in surfactants relates to the use of two types of surfactants in combination in the basic recipe, namely 1. glycerol monooleate and sorbitan monolaurate;
2. glycerol monooleate and sorbitan monopalmitate;
3. glycerol monooleate and sorbitan monostearate; and
4. glycerol monooleate and sorbitan monooleate.

A typical recipe for casting a polyvinyl chloride film that can be reverse printed, is as follows, in parts by weight:

| | |
|---|---|
| Polyvinyl chloride | 100.00 |
| Silica masterbatch | 7.87 |
| Polyester intermediate molecular weight plasticizer | 34.21 |
| Epoxy soybean oil | 5.00 |
| (2)-2-Hydroxy-s-methylpentyl (benzotriazole) | 0.20 |
| Glycerol monooleate | 3.00 |
| Tris-nonyl phenyl phosphite | 0.50 |
| Tetrahydrofuran | 700.00 |

The silica masterbatch was a blend of 100 parts PVC resin, 5 parts silica, 40 parts epoxy soybean oil, 5 parts trisnonyl phenyl phosphite and 3 parts of a calcium/zinc stearate. This recipe gives a cast polyvinyl chloride film of varying gauge and relative low speeds of production.

When the above recipe is modified by addition of one of the second surfactants listed above, the modified recipe permits cast films to be produced at speeds of 10 to 50 percent faster, the gauge variance can be held closer. Also, the cast film can be stripped from the casting surface, i.e. polyvinyl alcohol coated belt and rolled up at much faster speeds to produce film at a lower overall cost.

The nature of this invention, its advantages and benefits can be more readily appreciated by reference to the following examples where all parts and percentages are by weight unless otherwise designated.

EXAMPLE I

The base recipe set forth above was modified by using 2.00 parts instead of 3.00 parts of glycerol monooleate and addition of 2.0 parts of sorbitan monooleate as the second surfactant. This modified base recipe (i.e. experimental) and the base recipe (control) were used to case films of polyvinyl chloride on glass plates and on polyvinyl alcohol covered plates.

In order to determine the stripping force, several 10 inch by 12 inch glass plates were coated with a production top coat of 10 percent polyvinyl alcohol (PVA) using a knife setting of 8 mils and dried using standard methods well known in the art. The PVA-coated glass plates were then placed in a 120° F. oven for one-half hour prior to casting the control and experimental film recipes. Using a three inch wide draw-down knife, films were cast on the PVA-coated glass plates and allowed to dry in the 120° F. oven for a time shown in Table 1. At the end of this time period, the film samples were removed using a spring scale to determine the amount of force, in grams, required to strip the partially dried films from the PVA coating. The results of these stripping tests and other tests on the film is shown in Table 1.

Table 1

RELEASE CHARACTERISTICS OF CONTROL AND EXPERIMENTAL FILM RECIPES

| Film Recipe | Gauge (mils × 100) | Stripping Force[3] (grams) | Plate Out[4] | Surface Bloom[5] After 24 Hrs. |
|---|---|---|---|---|
| Control | 75 | 60 | No | No |
| Control modified by addition of | | | | |
| 3 phr Span 40[1] | 75 | 45 | No | No |
| 3 phr Span 80[2] | 75 | 45 | No | No |
| 4 phr Span 80 | 75 | 45 | No | No |
| 2/2* phr Span 80 | 75 | 55 | No | No |
| 3/1* phr Span 80 | 75 | 45 | No | No |
| 2/2* phr Span 40 | 75 | 45 | No | No |

[1]Span 40-tradename for sorbitan monopalmitate.
[2]Span 80-tradename for sorbitan monooleate.
[3]Stripping Force (grams) required to remove a 3" wide film from a PVA coating after 7 min. @ 120° F.
[4]Plate-out-Visual test conducted by checking for a deposit on the PVA surface after removal of film.
[5]Bloom-a visual test conducted to determine if any materials are exuding to the surface of the film.
*Designates amount of glycerol monooleate used in modified recipe.

Table 2 compares the physical properties of films cast from the control and experimental recipes.

Table 2

| Recipe | Gauge (mils × 100) | Oven Stability @ 215° F. for 7 & 14 days | Fisher Fog Rating[1] | RT Bloom[2] |
|---|---|---|---|---|
| Control | 75 | No bloom-no spew | 96,95 | No |
| Experimental | 75 | No bloom-no spew | 94,95 | No* |

[1]Fisher Fog Rating-Fisher Body Test 46-3; this test is conducted at 175° F., and the rating is a measure of Gloss; therefore, the higher the value the better the rating.
[2]Bloom-a visual test conducted to determine if any materials are exuding to the surface of the film.
*No bloom recorded after 35 days at room temperature.

After tests in the laboratory, the control and experimental recipes were run on production film casting equipment where the liquid recipe was fed onto a moving polyvinyl alcohol covered belt to deposit a film of about 75 mils and it was found the experimental recipe permitted the casting belt as well as the wind-up roll to be run from 10 to 50 percent faster. Several rolls of film produced with the experimental recipe, could be reverse printed as readily as the control film.

Generally, the total surfactant content of the first and second surfactants is present in 1.0 to 8.0 parts per hundred of PVC resin and the second surfactant is present in 0.5 to 4 parts per hundred of PVC resin.

While certain representative embodiments and details have been shown for the purpose of illustrating the invention, it will be apparent to those skilled in this art that various changes and modifications may be made therein without departing from the spirit or scope of the invention.

What is claimed is:

1. An improved casting film recipe composed of a polyvinyl chloride resin, plasticizer for polyvinyl chloride, stabilizer and sufficient solvent for the resin to permit it to be spread as a film and combination surfactants consisting of glycerol monooleate with at least a second surfactant selected from the class consisting of sorbitan monooleate, sorbitan monolaurate, sorbitan monopalmitate and sorbitan monostearate.

2. The recipe of claim 1 wherein the total surfactant present is 1.0 to 8.0 parts per hundred and the second surfactant present is 0.5 to 4 parts per hundred of resin.